United States Patent [19]

Carlier et al.

[11] Patent Number: 4,944,635

[45] Date of Patent: Jul. 31, 1990

[54] METHOD AND DEVICE FOR ACCUMULATING OBJECTS IN A PNEUMATIC CONVEYANCE SYSTEM

[75] Inventors: Michel Carlier, Wambrechies; Olivier Blic, Bondues, both of France

[73] Assignee: Oerlikon Motch Corporation, Hayward, Calif.

[21] Appl. No.: 249,357

[22] Filed: Sep. 23, 1988

[30] Foreign Application Priority Data

Oct. 2, 1987 [FR] France ................. 87 13673

[51] Int. Cl.$^5$ ............................. B65G 51/02
[52] U.S. Cl. ........................ 406/10; 406/19; 406/183
[58] Field of Search ............ 406/19, 22, 26, 31, 406/10, 86, 88, 72, 147, 176, 181, 183

[56] References Cited

U.S. PATENT DOCUMENTS

| | | | |
|---|---|---|---|
| 4,178,113 | 12/1979 | Beaver et al. | 406/10 |
| 4,191,499 | 3/1980 | Futer | 406/88 |
| 4,278,366 | 7/1981 | Loveless et al. | 406/72 |
| 4,822,214 | 4/1989 | Aidlin et al. | 406/88 |

*Primary Examiner*—Sherman D. Basinger
*Assistant Examiner*—Stephen P. Avila
*Attorney, Agent, or Firm*—Patrick J. Walsh

[57] ABSTRACT

The device is adapted for the accumulating of a variable number of objects having a collar (9) in the vicinity of their upper end, in particular plastic bottles (8). The holding of the objects is effected in each row by a flow of air coming from an elongated air conveyor arranged above the path of the objects, having a lower wall provided with a longitudinal slit the edges of which serve as guide for the collar (9) of the objects (8), a blow channel having lateral slits for the flow of the air being placed above the longitudinal slit so that the air acts on the upper end of the objects, causing their displacement. The device comprises a plurality of parallel, independent, separate accumulation rows (2a, 2b, 2c, 2d) which can be placed selectively, in succession, in communication with a distribution path (4) connected to the upstream row (6) and with a collection path (5) connected to the downstream row (7), each accumulation row having furthermore, on the downstream side, a controlled stop device (22a, 22b, 22c, 22d) capable of blocking the displacement of the objects.

20 Claims, 4 Drawing Sheets

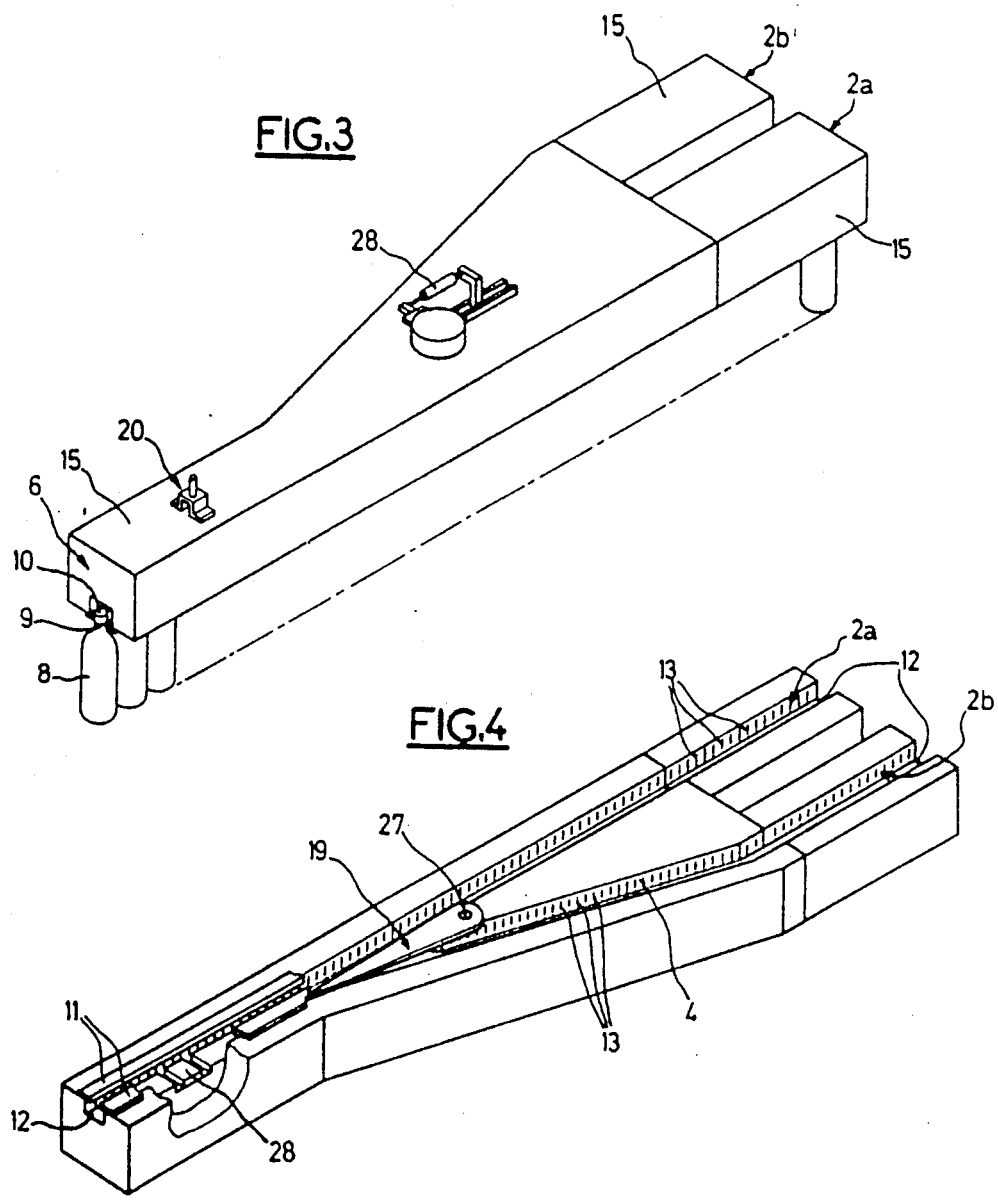

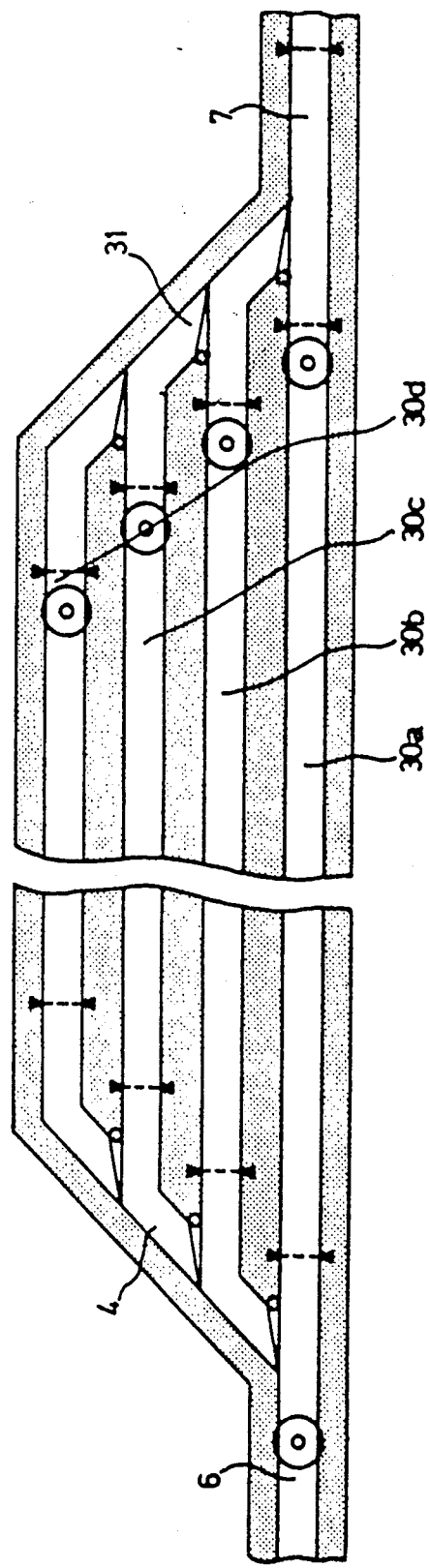

METHOD AND DEVICE FOR ACCUMULATING OBJECTS IN A PNEUMATIC CONVEYANCE SYSTEM

The object of the present invention is a method and a device for accumulating a variable number of objects, in particular empty containers such as plastic bottles, in a pneumatic conveyance system.

The various actions carried out on objects or containers, including their filling, require a plurality of machines which are connected together in a complete system by conveyors, for instance apron conveyors. In order that a machine which is located downstream is still continuously fed despite possible slowdowns in the operation of a machine which is located upstream or, on the other hand, in order that such an upstream machine can continue to produce even in case of the stopping of a downstream machine, an accumulation zone is generally provided between each machine. This accumulation zone can consist of a conveyor which has a wide single path from which the objects or containers are then transferred onto a conveyor having a narrow path which is connected to the machine which is located downstream. One thus obtains a reserve of objects or containers in a practically uninterrupted row.

The pressure which results from this single-path accumulation results in repeated disturbances, particularly due to the appearance of zones of clogging in the form of "bridges" which are formed in the stream of objects or containers on the accumulation conveyor. In order to avoid these difficulties one can contemplate subjecting the accumulation conveyor to vibrations. These vibrations however result in the danger of the falling over of the objects or containers. Furthermore, certain particularly unstable containers, such as plastic bottles the bottom of which has a plurality of bosses in petal shape, cannot, as a practical matter, be transported on such an apron accumulator device due to the substantial risk of falling, which makes increased supervision and complicated regulation of the overall device necessary.

In order to decrease the pressure on the objects or containers in the accumulation zone, one can contemplate varying the speed of the means of conveyance, in particular, adapting the speed of the accumulation conveyor to that of the system, by action on the regulation of the electric or hydraulic motors driving the conveyor devices. Despite the slight decrease in pressure which results therefrom on the objects or containers conveyed in the accumulation zone there inevitably remains a certain pressure due to the very principle of such an accumulator and a substantial risk of falling, which is prejudicial to the productivity of the entire system.

For the conveying of objects which have a collar in the vicinity of their upper end, in particular plastic bottles, it has already been recommended to use air conveyors in which the containers are transported in a single row. The holding of the objects is effected by means of a stream of air coming from an elongated caisson arranged above the path of the objects and having a lower wall provided with a slit the edges of which serve as guides for the collar of the objects. An air conveying channel having slits for the flow of air is placed above the longitudinal slit in such a manner that the air acts on the upper end of the objects, causing their displacement. Devices of this kind are described, for instance, in British Patent GB No. 2 092 981 (Smith), U.S. Pat. No. 3,850,478 (HURD) and furthermore European patent application EP No. 0 070 931 (The MOTCH and MERRYWEATHER), to which reference may be had for further information.

When using pneumatic holding devices of this type, in particular for empty plastic bottles, the accumulation zone which it is necessary to provide between an upstream machine and a downstream machine of a handling system, for instance a filling system, is in general formed by providing a sinusoidal accumulation path which increases the overall length of the transport row between the machines in question. While such an accumulator is satisfactory for small capacities, it results in substantial lengths, for example on the order of 50 meters for accumulations on the order of 500 bottles. As the accumulation path acts at the same time as a direct transfer line between the upstream machine and the downstream machine, a lack of flexibility of the system is noted. From the upstream machine to the downstream machine each object must pass over the entire length of the sinusoidal course of the conveyor, which may also result in problems due to the products transported being marked by rubbing against the lateral guides. Furthermore, the time of conveyance to move over the total length of the accumulation path results in difficulties in the general operation of the system. Finally, such an accumulation device requires a relatively large floor space.

The object of the present invention therefore is a method and a device for variable-capacity accumulation which eliminates any danger of the falling of the objects conveyed which are accumulated with minimum pressure between the different accumulated objects. The invention also has as its object such an accumulation method and device which guarantees the formation of an uninterrupted row of objects at the entrance of the downstream machine to be served, whatever the capacity of the latter, furthermore avoiding any risk of clogging due to the forming of bridges in the accumulation device.

For this purpose, the method of the invention for accumulating a variable quantity of objects, particularly empty containers, contemplates transporting the objects by a stream of air acting on the objects between an upstream handling machine from which the objects emerge in a row and a downstream handling machine which into which the objects enter in a row and the arrangement between upstream machine and downstream machine of a plurality of separate, independent, parallel accumulation rows capable of being fed and emptied selectively under the action of the same stream of air as a function of information relating to the absence or presence of objects at certain points of different rows.

The independent accumulation rows can advantageously be arranged parallel to each other side by side and, in a preferred embodiment, linearly, although a curved arrangement can also be contemplated.

The change in direction of the moving objects resulting in the transfer from one accumulation row to another accumulation row at an upstream point of distribution takes place by stopping the flow of the objects upstream of the distribution point and then moving a switch located between the two accumulation rows. The transfer from a first accumulation row to a second accumulation row is preferably controlled automatically as a function of the filling of the upstream portion of the first accumulation row, the filling of said upstream portion signifying that the said accumulation row is completely full.

In the same way, the change in the direction of the objects at a downstream point of collection is effected by releasing a given accumulation row and as a function of the filling of the downstream portion of the said accumulation row. In a preferred embodiment, switch means can also be provided in the vicinity of the downstream collection point for the different accumulation rows.

In one advantageous embodiment of the method of the invention, the feeding and emptying of the different accumulation rows can be effected by maintaining, among all of the accumulation rows, a main transfer path which is fed and emptied by way of priority.

The method of the invention can advantageously be carried out by first removing that object which has been fed first.

In general, the carrying out of the method of the invention can be adapted to each specific case by suitably controlling the closing of the different accumulation rows in their downstream portion and controlling the different switch means in the upstream portions of the different accumulation rows as a function of the information supplied by the different detectors which detect the presence or absence of the objects in the upstream and downstream portions of the different accumulation rows.

The device for the accumulation of a variable number of objects in accordance with the invention is particularly adapted to objects having a collar in the vicinity of their upper end, particularly empty plastic bottles or blanks for the manufacture of such bottles. The device is intended to be mounted in a holding system between an upstream handling machine from which the objects emerge in an upstream row and a downstream handling machine into which the objects enter in a downstream row. The holding of the objects is effected in each row by a flow of air coming from an elongated air conveyor arranged above the path of the objects. The air conveyor has a lower wall provided with a longitudinal slit the edges of which serve as guides for the collar of the objects. An air conv channel having lateral slits for the flow of the air is placed above the longitudinal slit so that the air acts on the upper end of the objects, thus causing their displacement. In accordance with the invention, the device comprises a plurality of separate, independent, parallel accumulation rows which can be placed selectively and successively in communication with a distribution path connected to the upstream row and with a collection path connected to the downstream row. Each accumulation row furthermore is provided on the downstream side with a controlled stop device capable of blocking the displacement of the objects in the accumulation row concerned.

At least certain accumulation rows comprise, on the upstream side, a controlled switch means capable of opening or closing the communication between the accumulation file and the distribution path. A controlled stop device placed in the upstream row is controlled by the different switch means in such a manner as to stop the displacement of the objects in order to permit the movement of the switch means.

On the side of the collection paths it is possible also to provide controlled switch means which facilitate the transfer of the objects from an accumulation row into the collection path. In certain applications it is possible, however, to suppress these switch means which are placed at the downstream ends of the accumulation rows.

Each accumulation row furthermore comprises, on its upstream-end side, a detector capable of detecting the presence of stationary objects corresponding to the fact that the corresponding row is completely full.

Automatic control means are associated with the accumulation device so as to selectively actuate the different stop devices and the switch means with which the accumulation device is provided, in accordance with a predetermined program and as a function of the signals given off by the different detectors. It is thus possible, as a function of the particular requirements of the system, to use the method of the invention in a special manner by causing the different objects to pass selectively, in succession, through the different accumulation rows.

Each accumulation row also comprises, on its downstream-end side, a detector which is capable of detecting the passage of the objects to the outlet of the accumulation row.

Finally, a detector is also arranged on the downstream row in order to detect, by the presence of stationary objects, the stopping or slowing down of the downstream handling machine, resulting in the automatic placing into operation of the accumulation device. Another detector is also arranged on the downstream row and is capable of controlling the emptying of the accumulator upon detection of the absence of objects in the downstream row corresponding to the placing in operation of the downstream machine. These two detectors can be combined into a single detector which is associated with a time-delay device.

In one advantageous embodiment of the device of the invention, the different accumulation rows are all of the same length, the first accumulation row being located along the extension of the upstream row while the last accumulation row is located along the extension of the downstream row. In another embodiment, the accumulation rows can have different lengths from each other, the first accumulation row being then arranged in the extension of both upstream and downstream rows.

In all cases, the distribution path forms an acute angle with the different accumulation rows, this angle being preferably between about 3° and 30°. The collection path forms an obtuse angle with the different accumulation rows, this angle being preferably between about 177° and 150°.

The invention will be better understood from a study of the detailed description of a few embodiments given by way of illustration and not of limitation and shown in the accompanying drawings, in which:

FIG. 3 is a diagrammatic view in perspective of a distribution point between two adjacent accumulation rows, also showing the stop device placed on the upstream row, the assembly being viewed from above;

FIG. 4 is a view in perspective similar to that of FIG. 3 showing the same part of the device, but viewed from below; and FIG. 5 is a diagrammatic view similar to FIG. 1, showing a variant of an accumulation device according to the invention.

Figure 1:
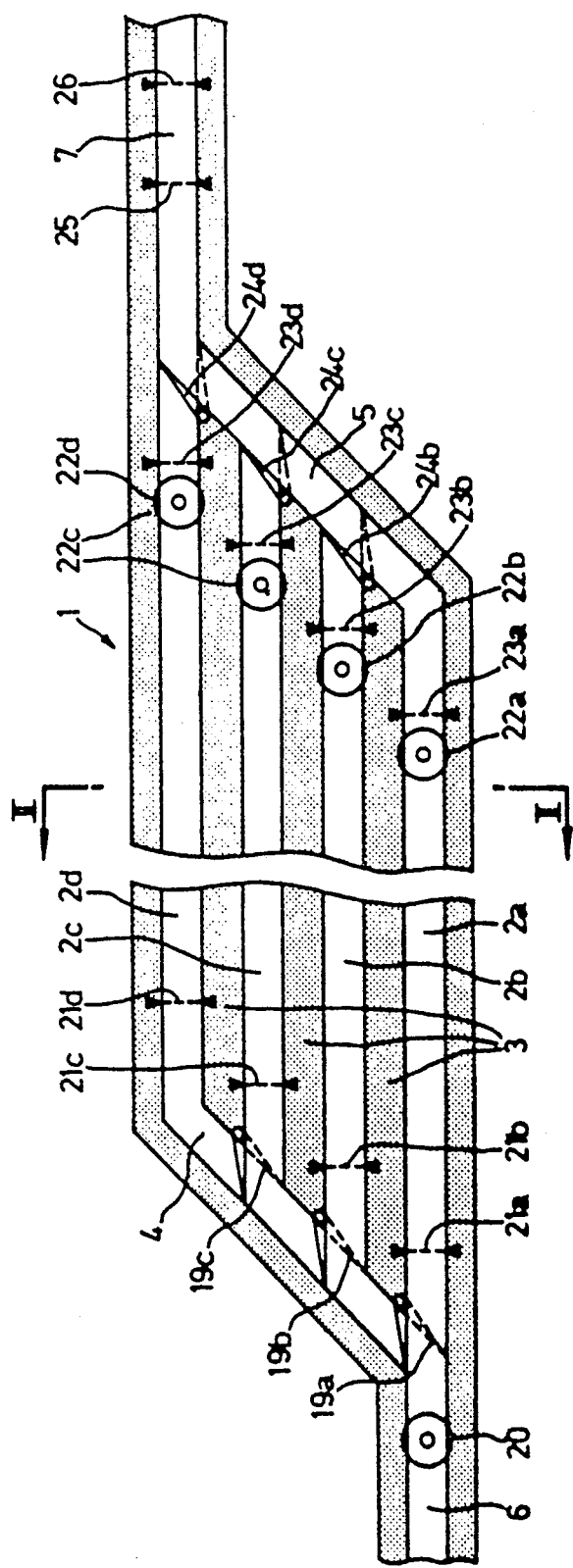
FIG. 1 is a diagrammatic top view of a first embodiment of an accumulation device according to the invention, in which the upper walls have been removed so as diagrammatically to show the different accumulation rows.

As shown in the figures, the accumulation device of the invention is more particularly adapted to the holding of plastic bottles having a collar at the base of their neck. The accumulation device, designated generally as 1, has a plurality of accumulation rows 2a, 2b, 2c and 2d parallel to each other and separated, or not, by intermediate partitions 3. The different rows 2a to 2d are all linear and are of the same length. The different upstream ends may all be placed, successively and selectively, in communication with a distribution path 4 which is inclined with respect to the different rows 2a to 2c at an angle of about 30°. On their downstream-end side, the different rows 2a to 2d can be placed in communication with a collection path 5 which is parallel to the distribution path 4.

The accumulation device 1 is connected on the one side to an individual upstream row 6 transporting the bottles coming from an upstream handling machine (not shown in the drawing) and on the other side to an individual downstream row 7 transporting the bottles in the direction towards a downstream handling machine, not shown in the drawing. The upstream row 6 is located in the extension of the first accumulation row 2a while the downstream row 7 is located in the extension of the last accumulation row 2d.

Figure 2:
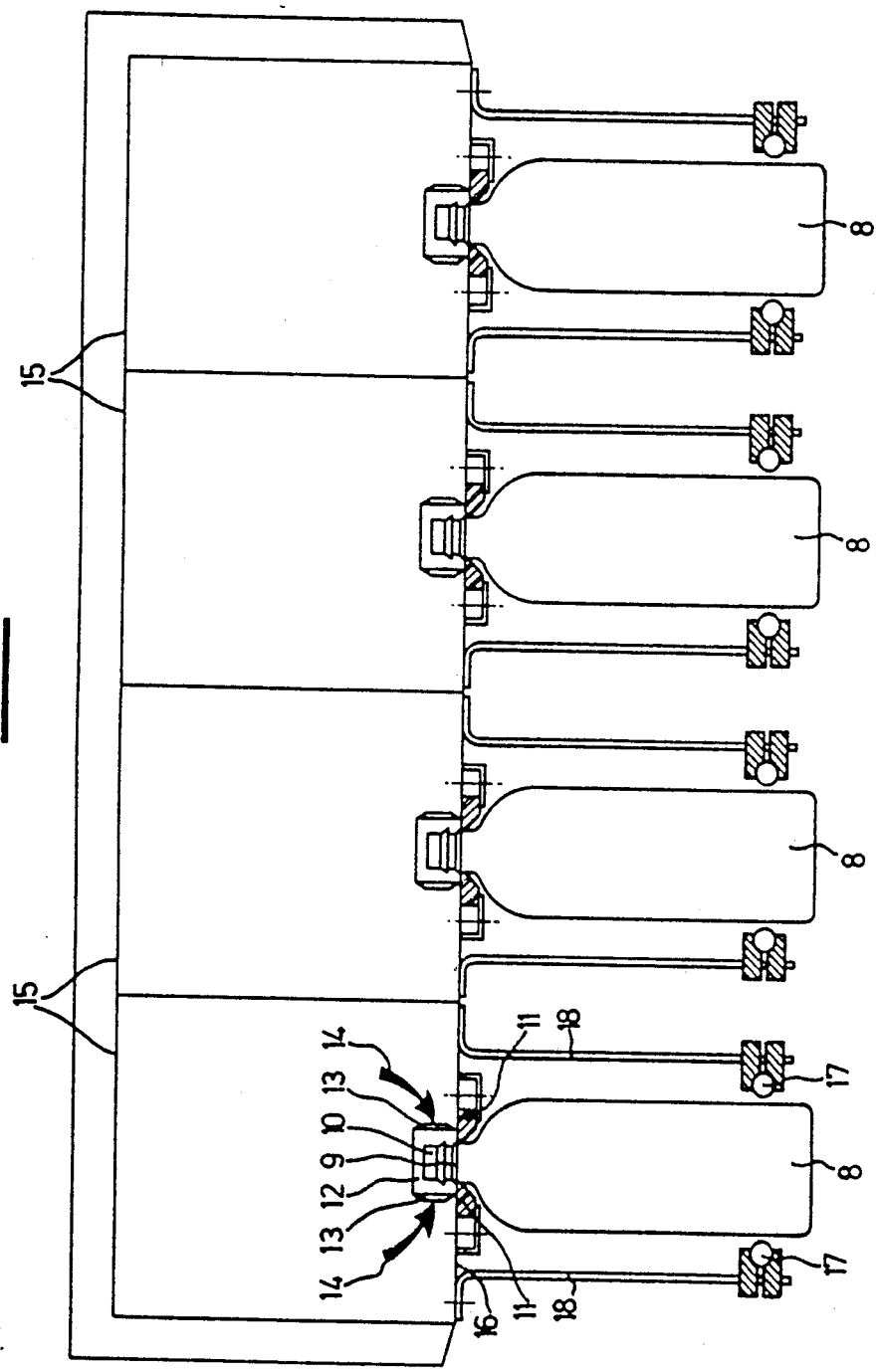
FIG. 2 is a view on a larger scale in a cross section along the line II—II of FIG. 1.

Referring to FIG. 2, it is seen that the different plastic bottles 8 have a collar 9 which protrudes circumferentially at the base of the neck 10. The collar 9 rests against two upper guides 11 of plastic or other material. The neck 10 is located above a longitudinal slit defined between the two guides 11 and the inside of air conveying channel 12. The air conveying channel 12 has on its side faces air slits 13 directed in such a manner that a flow of air represented by the arrows 14 coming from the air conveyor 15 acts on the neck 10 to cause the displacement of the bottle 8 along the path represented by the various rows mentioned above. It will be noted that the rows 2a to 2d, 6 and 7 as well as distribution path 4 and collection path 5 shown diagrammatically in FIG. 1 correspond in fact essentially to the air conveying channels 12 visible more precisely in FIG. 2. The air conveyors 15 are of elongated shape and are arranged parallel to each other, as can be noted from FIG. 2. Their lower face 16 has the longitudinal slit mentioned above, the edges of which are defined by the lateral guides 11 so as to permit the holding of the bottles 8. The device is supplemented by lower later guides 17 which extend along the entire path, not being normally in contact with the bottle 8 but making it possible to limit the tilting movements of the latter upon its displacement. The guides 17 placed on each side of a row are supported from place to place by uprights 18.

Referring again to FIG. 1, it is seen that switch means 19a, 19b and 19c are provided at the points of branching between the distribution path 4 and the accumulation rows 2a, 2b and 2c. The switch means comprise a blade movable around a vertical axis so as to be able to occupy two positions defining two possible paths for the moving bottles coming from the upstream row 6. Thus in the position shown in solid line in FIG. 1, the switch 19a blocks the passage from the upstream row 6 towards the distribution path 4 so that the moving bottles are transported directly onto the first accumulation row 2a. On the other hand, in the position shown in dashed line, the switch 19a would permit the passage of the bottles by the distribution path 4. If the switch 19b is in the position shown in solid line, the bottles are then transferred into the second accumulation row 2b. In the same way, if the switch 19b is in the position illustrated in dashed line, the bottles pass from the upstream row 6 to the distribution path 4 and then into the accumulation row 2c. Finally, when all the switch means 19a, 19b, 19c are in the position shown in dashed line in FIG. 1, the bottles pass through the entire distribution path 4 in order to enter into the last accumulation row 2d.

A controlled stop device 20, represented symbolically in FIG. 1, is placed in the upstream row 6 in such a manner as to block the displacement of the bottles during the movement of rotation of any one of the switch devices 19a, 19b or 19c.

Each accumulation row 2a to 2d has, in the vicinity of its upstream end close to the distribution path 4, a detector 21a, 21b, 21c and 21d which is represented symbolically in FIG. 1 and which is capable of detecting the presence of a stationary bottle in the corresponding row, this corresponding to the accumulation row in question being completely full.

The different accumulation rows 2a to 2d are each provided, on their downstream-end side, with a stop device 22a, 22b, 22c and 22d as well as a detector 23a, 23b, 23c and 23d placed in the corresponding row downstream of the stop device 22a to 22d. Switches 24b to 24c and 24d are also arranged at the junction points between the respective rows 2b, 2c, 2d and the collection path 5.

Finally, the device is supplemented by a detector 25 placed in the downstream row 7 and a detector 26 mounted downstream of the detector 25 in the same downstream row 7.

The different accumulation rows 2a to 2d can be fed and emptied selectively as a function of the information coming from the different detectors of the device 1. In general, the operation of the device 1 is such that the transfer of the bottles from a first accumulation row to an adjacent second accumulation row is controlled automatically as a function of the filling of the upstream portion of the first accumulation row.

If, for instance, the different switches 19 and 24 are in the position shown in solid line in FIG. 1, the bottles pass, under the action of the flow of air, from the upstream row 6 via the accumulation row 2a and the collection path 5 to the downstream row 7. If the downstream machine stops, an accumulation of bottles takes place in the downstream row 7. At the time that this accumulation reaches the detector 25 the latter brings about the placing in operation of the accumulator device 1. For this purpose the stop device 22a is first of all controlled, which causes the starting of the accumulation of the bottles in the first accumulation row 2a. This accumulation continues until the detector 21a which is located upstream detects a stationary bottle, this corresponding to the first accumulation row 2a being completely full. This situation automatically causes action on the stop device 20, which blocks the arrival of the bottles by the upstream row 6 and makes it possible to change the position of the switch 19a which comes into the position shown in dashed line in FIG. 1. The stop device 20 is then again opened, which permits the passage of the bottles over a portion of the distribution path 4 into the second accumulation row 2b. For this purpose, the switch 19b is in the position illustrated in solid line in FIG. 1. Furthermore, the stop device 22b is in blocking position as are furthermore all the stop devices 22a to 22d. The accumulation takes place thus until all the rows of the accumulation device 1 are filled, which corresponds to the maximum accumulation. As soon as the downstream machine has been restored to operation, which is detected by the detector 26 noting an absence of a bottle, it is possible to empty any of the accumulation rows which have been previously filled. In one advantageous embodiment, the first bottles to have entered the accumulation device 1, that is to say those of the first accumulation row 2a, are removed, although other manners of operation can be contemplated. For this purpose, with the different switches 24b to 24d held in the position shown in solid line in FIG. 1, the stop device 22a is opened, which automatically causes the emptying of the row 2a via the collection path 5. At the same time, the arrival of the bottles can be modified by acting first of all on the stop device 20 and then again placing the switch 19a in the position shown in solid line in FIG. 1. The accumulation row 2a then constitutes, so to speak, a principal transfer path, opened by way of priority, while the other accumulation paths 2b, 2c and 2d serve as accumulation zone and as storing and unstoring means. The bottles which are stored in these accumulation rows will then be used in the event that, the downstream machine operating normally, it is the upstream machine which is temporarily stopped. In such case, the absence of bottles in the first accumulation row 2a is detected by the detector 23a, which automatically causes the change in position of the switch 24b, which is placed in the position illustrated in dashed line in FIG. 1, and then the opening of the stop device 22b automatically bringing about the emptying of the second accumulation row 2b. As long as the upstream machine remains stopped, the accumulation device 1 is thus capable of feeding the downstream machine, successively emptying the different accumulation rows as just stated.

In all cases, the continuous feeding of air into the different caissons causes the bottles to be pushed at all times by the flow of air acting on their neck. When the feeding of the bottles is stopped for a short period of time by a stop device such as the device 20 in order to permit the change in position of a switch such as the switch 19a, the longer space created upon this maneuver between the successive bottles is taken up very rapidly as a result of the acceleration of the transported bottles by the flow of air.

The device thus placed in operation avoids the drawbacks of the accumulator used up to the present time and in particular any risk of the falling of the bottles, the bottles being held individually by their neck in separate rows. This accumulator makes it possible to avoid excessive pressure between the bottles transported and transforms the accumulation with mechanical friction of the devices known heretofore into an accumulation with aerodynamic friction which does away with a risk of the deforming of the products. The collection by the emptying of several accumulation rows onto the single downstream row can be effected at any time without it being necessary to fill all of the rows of the accumulator. It is sufficient for this to control the opening of the stop device 22a to 22d corresponding to the row desired as soon as the corresponding switch 24b to 24d has been suitably set. The stop device 22a to 22d is closed automatically as soon as the corresponding row has been completely emptied, in order to repeat the same emptying maneuver on the other rows. The length and number of the rows of the accumulator 1 can, of course, be modified and adapted to each case as a function of the accumulation potential necessary.

The controlling of the operation of the device, that is to say the succession of the filling and emptying operations of the different accumulation rows, takes place advantageously under the control of an automatic device not shown in the figures which receives the signals coming from the different detectors and causes the opening and closing of the stop devices as well as the changes in position of the different switches.

By way of example, one possible embodiment of a switch 19 and a stop device 20 is shown in FIGS. 3 and 4. In these figures there is again shown the caisson 15 of the upstream row 6 as well as the bottles 8 suspended by their collar 9. To simplify matters, only two accumulation rows 2a and 2b have been shown in these figures. The movable tongue 19 which constitutes the active path of the switch is mounted for swinging around a vertical pin 27 which can be driven in rotation by the rod system 28 under the action of a motor, not shown in the figure. The stop device 20 comprises a movable stop 28 which can move vertically, passing through the upper wall of the channel 12 so as to block the passage within said channel 12 of a container 8 by acting on the upper part of the neck 10. The vertical displacement of the movable stop 28 is caused by a drive motor, not shown in the figure.

In another embodiment of the invention shown in FIG. 5, the different accumulation rows 30a, 30b, 30c and 30d are all of different length. They are arranged, as in the previous embodiment, parallel to each other. The distribution path 4 is arranged in the same way but the collection path 21 is inclined symmetrically. The first accumulation row 30a is located in the extension of both the upstream row 6 and the downstream row 7.

One could, of course, devise other arrangements; the accumulation device could, for instance, be curved instead of having the linear structure illustrated in the preceding embodiments.

We claim:

1. A method of accumulating a variable number of objects such as empty containers comprising the steps of providing means for air conveying the containers along an upstream row emerging from an upstream handling machine and along a downstream row entering a downstream handling machine, providing a plurality of separate, independent, parallel accumulation rows between the upstream and downstream rows with each accumulation row providing a channel for flow-through of objects from the upstream row to the downstream row, monitoring the absence or presence of objects at certain points of the various rows, closing access to each accumulation row in which the presence of objects is monitored, diverting containers to another accumulation row, and releasing objects from accumulation when the absence of objects is monitored at certain points in various rows.

2. A method of accumulation according to claim 1, including the step of arranging the accumulation rows side by side.

3. A method of accumulation according to claim 1, including the step of stopping the flow of the objects upstream of a point of distribution prior to diverting objects from one accumulation row to another accumulation row at the distribution point.

4. A method of accumulation according to claim 3, including the step of automatically controlling the transfer of objects from a first accumulation row to a second accumulation row as a function of the filling of the upstream portion of the first accumulation row.

5. A method of accumulation according to claim 4, including the step of stopping the flow of objects upstream of a collection point and then displacing a switch means to empty an accumulation row at a downstream collection point.

6. A method of accumulation according to claim 5, including the step of monitoring the presence or absence of objects in a downstream row be for placing in operation the accumulation and the emptying steps.

7. A method of accumulation according to claim 1, including the step of maintaining among the total of the accumulation rows a main transfer path which is fed and emptied by way of priority effecting the feeding and the emptying of the different accumulation rows.

8. A method of accumulation according to claim 7, including the step of feeding and emptying of the different accumulation rows by emptying the object first which has been fed first.

9. A device for the accumulating of a variable number of objects comprising a collar (9) in the vicinity of their upper end, in particular plastic bottles (8), intended to be mounted in a holding installation between an upstream handling machine from which the objects emerge in an upstream row and a downstream handling machine into which the objects enter in a downstream row, the holding of the objects being effected in each row by a flow of air coming from an elongated caisson (15) arranged above the path of the objects (8), having a lower wall provided with a longitudinal slit the edges (11) of which serve as guide for the collar (9) of the objects (8), an air conveying channel (12) having lateral slits (13) for the flow of air being placed above the longitudinal slit so that the air acts on the upper end (10) of the objects (8), causing their displacement, characterized by the fact that it comprises a plurality of separate, independent, parallel accumulation rows (2a, 2b, 2c, 2d) which can be placed selectively, in succession, in communication with a distribution path (4) connected to the upstream row (6) and with a collection path (5) connected to the downstream row (7), each accumulation row furthermore having on the downstream side a controlled stop device (22a, 22b, 22c, 22d) capable of blocking the displacement of the objects.

10. A device according to claim 9, characterized by the fact that certain accumulation rows comprise, on the upstream side, a controlled switch means (19a, 19b, 19c) capable of opening and closing the communication of the accumulation row with the distribution path (4).

11. A device according to claim 10, characterized by the fact that a stop device (10) is placed in the upstream row (6) upstream of the accumulation device, the control of the stop device being synchronized with that of the different switch means.

12. An accumulation device according to any of claims 9 to 11, characterized by the fact that each accumulation row comprises, on the upstream side, a detector (21a, 21b, 21c, 21d) capable of detecting the presence of a stationary object corresponding to the complete filling of the corresponding row.

13. An accumulation device according to any of claims 9 to 11, characterized by the fact that each accumulation row comprises, on the downstream side, a detector (23a, 23b, 23c, 23d) capable of detecting the absence of movement of objects in the corresponding row.

14. An accumulation device according to any of claims 9 to 11, characterized by the fact that certain accumulation rows comprise, on the downstream side, a controlled switch means (14b, 24c, 24d) capable of opening or closing the communication of the corresponding accumulation file with the collection path, this movement being synchronized with the operation of the stop devices placed in the downstream portions of the different accumulation rows.

15. An accumulation device according to any of claims 9 to 11, characterized by the fact that it furthermore comprises automatic control means capable of selectively actuating the different stop devices and switch means as a function of signals given off by the different detectors.

16. An accumulation device according to any of claims 9 to 11, characterized by the fact that each accumulation row furthermore comprises lower guides (17) which cooperate with the side faces of the lower portions of the objects (8).

17. An accumulation device according to any of claims 9 to 11, characterized by the fact that detection means (25, 26) are placed downstream of the accumulation device in the downstream row so as to control the placing in operation of the accumulation device by successive filling of the accumulation rows, on the one hand, and the emptying of the accumulation device on the other hand.

18. An accumulation device according to any of claims 9 to 11, characterized by the fact that all the accumulation rows have the same length, the first accumulation row being located in the extension of the upstream row while the last accumulation row is located in the extension of the downstream row.

19. An accumulation device according to any of claims 9 to 11, characterized by the fact that the accumulation rows are all of different length, the first accumulation row being located along the extension of the upstream and downstream rows.

20. An accumulation device according to any of claims 9 to 11, characterized by the fact that the distribution path forms an acute angle of about 3° to 30° with the different accumulation rows and that the collection path forms an obtuse angle of about 177° to 150° with the different accumulation rows.

* * * * *